(12) United States Patent
Johnson, III et al.

(10) Patent No.: US 8,875,155 B2
(45) Date of Patent: *Oct. 28, 2014

(54) ORDERED PROCESSING OF GROUPS OF MESSAGES

(71) Applicant: Attivio, Inc., Newton, MA (US)

(72) Inventors: William K. Johnson, III, Waltham, MA (US); Martin Anthony Serrano, Andover, MA (US)

(73) Assignee: Attivio, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,624

(22) Filed: Jul. 16, 2013

(65) Prior Publication Data

US 2014/0052798 A1 Feb. 20, 2014

Related U.S. Application Data

(63) Continuation of application No. 12/905,211, filed on Oct. 15, 2010, now Pat. No. 8,495,656.

(51) Int. Cl.
| | | |
|---|---|---|
| *G06F 13/00* | (2006.01) | |
| *G06F 9/54* | (2006.01) | |
| *G06F 17/30* | (2006.01) | |
| *H04L 12/58* | (2006.01) | |

(52) U.S. Cl.
CPC .............. *H04L 51/043* (2013.01); *G06F 9/546* (2013.01); *G06F 17/30017* (2013.01)
USPC ........................................................ 719/314

(58) Field of Classification Search
CPC ........................................................ G06F 9/546
USPC ........................................................ 719/314
See application file for complete search history.

(56) References Cited

U.S. PATENT DOCUMENTS

| | | | |
|---|---|---|---|
| 5,588,117 A | 12/1996 | Karp et al. | |
| 6,341,302 B1 | 1/2002 | Celis | |

(Continued)

FOREIGN PATENT DOCUMENTS

| | | | |
|---|---|---|---|
| JP | 6-318158 A | 11/1994 | |
| JP | 7-319787 A | 12/1995 | |

(Continued)

OTHER PUBLICATIONS

Final Office Action received for U.S. Appl. No. 12/456,517, mailed on Sep. 13, 2012, 15 pages.

(Continued)

*Primary Examiner* — Andy Ho
(74) *Attorney, Agent, or Firm* — Patent GC LLC

(57) ABSTRACT

A data flow processing system represents processing by a directed graph including processing nodes that generate, and process, groups of dependent messages and that can process such groups of messages in order. To identify a group of messages, the system applies message identifiers to messages. Processing of a message may generate child messages. A child message is assigned a message identifier that incorporates the message identifier of the parent message. The message identifier of the parent message is annotated to indicate the number of related child messages. The processing node maintains a buffer to store messages in the group. When a message is received, its message identifier indicates whether it is in a group and information about the group. From this information the processing node determines whether all messages within the group have been received, at which time the processing node can process the messages in order.

15 Claims, 10 Drawing Sheets

(56) References Cited

U.S. PATENT DOCUMENTS

| | | | |
|---|---|---|---|
| 6,578,159 | B1 | 6/2003 | Kitagawa et al. |
| 7,434,225 | B2 | 10/2008 | Groetzner et al. |
| 7,600,131 | B1 | 10/2009 | Krishna et al. |
| 7,761,514 | B2 | 7/2010 | Popescu et al. |
| 7,836,143 | B2 | 11/2010 | Blocksome et al. |
| 7,856,415 | B2 | 12/2010 | Gatti |
| 8,064,446 | B2 | 11/2011 | Ramakrishnan et al. |
| 8,081,628 | B2 | 12/2011 | Wu et al. |
| 8,194,690 | B1 | 6/2012 | Steele et al. |
| 8,271,996 | B1 | 9/2012 | Gould et al. |
| 8,295,203 | B2 * | 10/2012 | Ramakrishnan et al. ..... 370/256 |
| 8,316,443 | B2 * | 11/2012 | Rits et al. ................ 726/22 |
| 8,495,656 | B2 | 7/2013 | Johnson, III et al. |
| 8,649,377 | B2 * | 2/2014 | Ramakrishnan et al. ..... 370/390 |
| 2002/0111986 | A1 | 8/2002 | Wolfson |
| 2002/0128919 | A1 | 9/2002 | Rime et al. |
| 2002/0194327 | A1 | 12/2002 | DeGilio et al. |
| 2003/0110230 | A1 | 6/2003 | Holdsworth et al. |
| 2003/0126294 | A1 | 7/2003 | Thorsteinson et al. |
| 2003/0158883 | A1 | 8/2003 | Drudis |
| 2003/0223466 | A1 | 12/2003 | Noronha, Jr. et al. |
| 2004/0120301 | A1 | 6/2004 | Kitchin |
| 2005/0038824 | A1 | 2/2005 | Kenntner et al. |
| 2005/0138632 | A1 | 6/2005 | Groetzner et al. |
| 2006/0015811 | A1 | 1/2006 | Tanaka et al. |
| 2006/0269063 | A1 | 11/2006 | Hauge et al. |
| 2007/0118601 | A1 | 5/2007 | Pacheco |
| 2007/0124398 | A1 | 5/2007 | Parkinson et al. |
| 2007/0143442 | A1 | 6/2007 | Zhang et al. |
| 2008/0259960 | A1 | 10/2008 | Favor et al. |
| 2008/0289039 | A1 | 11/2008 | Rits et al. |
| 2009/0164548 | A1 | 6/2009 | Hayer et al. |
| 2009/0208009 | A1 | 8/2009 | Hauge et al. |
| 2010/0005147 | A1 | 1/2010 | Johnson, III et al. |
| 2012/0096475 | A1 | 4/2012 | Johnson, III et al. |
| 2013/0046442 | A1 * | 2/2013 | Hayama et al. ................. 701/42 |

FOREIGN PATENT DOCUMENTS

| | | |
|---|---|---|
| JP | 9-83541 A | 3/1997 |
| JP | 2000-163372 A | 6/2000 |
| JP | 2002-314566 A | 10/2002 |
| JP | 2002-314606 A | 10/2002 |
| JP | 2003-283539 | 10/2003 |
| JP | 2010-524333 A | 7/2010 |
| WO | 2009/154752 A1 | 12/2009 |
| WO | 2010/093288 A1 | 8/2010 |
| WO | 2012/051366 A2 | 4/2012 |
| WO | 2012/051366 A3 | 8/2012 |

OTHER PUBLICATIONS

Non Final office Action received for U.S. Appl. No. 12/456,517, mailed on Mar. 16, 2011, 14 pages.
Non Final Office Action received for U.S. Appl. No. 12/456,517, mailed on Oct. 26, 2011, 14 pages.
Non Final Office Action received for U.S. Appl. No. 12/905,211, mailed on Oct. 3, 2012, 8 pages.
Notice of Allowance Received received for U.S. Appl. No. 12/905,211, mailed on Mar. 21, 2013, 9 pages.
International Search Report and Written Opinion received for PCT Patent Application No. PCT/US2009/003626, mailed on Nov. 5, 2009, 10 pages.
International Preliminary Report on Patentability received for PCT Patent Application No. PCT/US2011/056054, mailed on Apr. 25, 2013, 5 pages.
International Search Report and Written Opinion received for PCT Patent Application No. PCT/US2011/056054, mailed on Jun. 18, 2012, 7 pages.
Office Action received for Japanese Patent Application No. 2013-533990, mailed on Sep. 5, 2013, 2 pages of Office Action and 2 pages of English translation.
Office Action Received for Japanese Patent Application No. 2011-514608, mailed on Oct. 8, 2013, 3 pages of Office Action and 4 pages of English Translation.
Second Office Action Received for Japanese Patent Application No. 2011-514608, mailed on Jul. 8, 2014, with partial English Translation.
Takashi Sonoda, "Evaluation of Link Aggregation by Duplication and Unification of Packets for TCP Traffic", IEICE Technical Report, Japan, The Institute of Electronics, Information and Communication Engineers, Feb. 27, 2004, vol. 103, No. 692, pp. 171-174, with English Abstract.
Notice of Allowance received in connection with U.S. Appl. No. 12/456,517, mailed on May 29, 2014.

* cited by examiner

ORDERED PROCESSING OF GROUPS OF MESSAGES

BACKGROUND

High-throughput data flow processing is commonly implemented by representing data flow using a directed graph, in which nodes represent computation resources and edges represent data transmission paths among the nodes. In such cases, nodes can be decoupled from each other by using asynchronous data transmission. This decoupling allows each computation node to execute as efficiently as possible since it does not have to wait for downstream nodes to complete processing before it can begin processing the next message. In some cases, multiple computation nodes can be executed in parallel and together act as a single computation node, thus processing many units of work simultaneously.

A Staged Event Driven Architecture (SEDA) enhances this approach by inserting bounded queues between computation nodes. When a node A attempts to transfer work to another node B, if the queue between the nodes A and B is full, then A blocks until B has consumed some work from the queue. This blocking of A prevents A from consuming new work which in turn causes its input queue to get full, blocking any predecessors. One example of a process that utilizes such a technique is search engine document ingestion, in which multiple forms of documents (emails, PDFs, multimedia, blog postings, etc.) all need to be processed and indexed by a search engine for subsequent retrieval.

A scalable system that can process large amounts of data can be provided by using such asynchronous directed graph models. In some applications, documents may need to be processed in order. However, a system based on an asynchronous direct graph model generally cannot guarantee that documents are processed in order. One prior solution to this problem, described in U.S. Patent Publication 2010/0005147, is a system in which all messages are processed in order.

SUMMARY

A highly parallel, asynchronous data flow processing system in which processing is represented by a directed graph, can include processing nodes that generate, and process, groups of dependent messages and process messages within such groups in order. Other messages can be processed in whatever order they are received by a processing node.

To identify a group of dependent messages, message identifiers are applied to a message. Processing of a message may generate child messages. A child message is assigned a message identifier that incorporates the associated message identifier of the parent message. The message identifier of the parent message is annotated to indicate the number of related child messages.

When a group of messages is processed by a processing node in order, the processing node maintains a buffer in which messages in the group are stored. When a message is received, its message identifier indicates whether it is in a group, its parent node, if any, and the number of child nodes it has if it is a parent node. From this information, it can be determined whether all messages within the group have been received. When all of the messages within the group have been received, the processing node can process the messages in order.

DETAILED DESCRIPTION

The processing and ingestion of documents into an indexed, searchable data store, involves numerous steps, some of which are executed in a particular order and others that are processed in parallel. As used herein, the term document may refer to unstructured data such as .pdf files, video, audio, email, or to structured data such as XML files, .csv files, or data received from database sources. In order to facilitate document processing and ingestion, documents are held within messages having unique message IDs.

Some documents (e.g., emails having multiple attachments) include yet other documents. Such documents introduce the possibilities of multiple processing threads that process the document, differing processing times for different parts of the document, and recursive processing of documents. If committing data from such a document to a database is dependent on the completion of processing of the document, such possibilities introduce significant complexities into the processing of documents.

Figure 1:
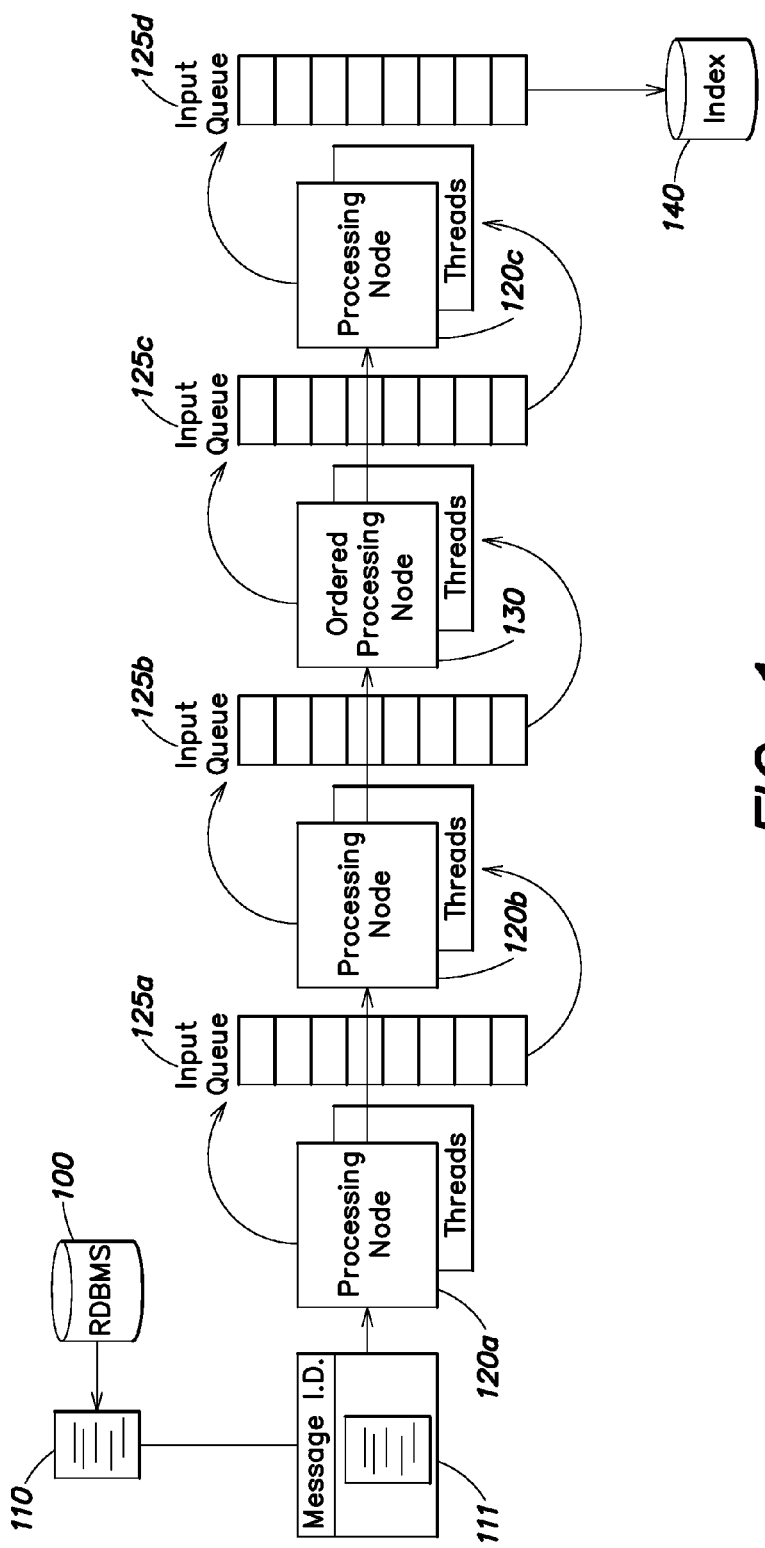
FIG. 1 is a block diagram of an example computer system implementing a highly parallel, asynchronous data flow processing system that represents processing using a directed graph.

FIG. 1 illustrates an example computer system implementing a highly parallel, asynchronous data flow processing system that represents processing using a directed graph, for processing documents. One or more documents 110 supply input to the system via a document store 100, such as a record-based database management system (RDBMS). Documents 110 are inserted into messages 111, each having a unique message identifier. Processing nodes 120a-c receive the messages 111 and process the documents within them accordingly. Each processing node 120a-c may comprise multiple thread pools allowing the processing of many messages 111 simultaneously. Input queues 125a-d precede each processing node. Input queues 125a-d allow each node to process messages without over committing resources, blocking preceding nodes as the queues get full. As such, the input queues 125a-d along with thread pools bound load on the overall system. After each message is processed, it may, for example, be ingested into an indexed, searchable data store 140.

Such a system is typically implemented using a platform (e.g., computer with an operating system and application processing framework), which is designed to process applications that are created by programmers that conform to a specification. For example, programmers create applications with interconnected processing nodes that form a highly parallel arbitrary directed graph.

In such applications, the application programmer will determine whether a particular processing node may generate, or will process, messages in a particular order with respect to each other. Most messages do not need to be processed in order. Processing nodes which do not require ordered message processing can run in parallel with other nodes without consideration of message ordering. However, some processing nodes generate multiple messages, or a group of messages, from a single message, and messages in this group of messages may need to be processed in order with respect to each other. Also, a processing node may receive one or more of the messages from a group of messages, and may need to process the messages it has received in order with respect to each other. Other messages not in the group can be processed in any order with respect to the group. The application programmer would determine whether a processing node will create groups of dependent messages, and whether a processing node will process messages from a group of dependent messages in order.

In general, message ordering is preserved in this system by grouping dependent messages together. As an example, groups of messages may be identified by using message identifiers that represent the dependency among messages as a tree. Characteristics of individual nodes and the messages being processed can be used to direct message flow such that ordering constraints are met and recursive processing is permitted without impacting overall system performance. For example, some processing nodes may not require ordered message processing, and some message types need not be processed in any particular order.

Any processing node can be configured to detect whether it is processing a message from a group of messages requiring ordered processing. For example, in FIG. 1, processing node 130 detects a message from a group of message then stops processing and waits to receive the messages that precede the received message in the group of messages. Processing nodes requiring ordered message processing of groups are annotated as such and are preceded by a modified input queue that delivers messages in a group of messages in order based on the message identifier.

Figure 2:
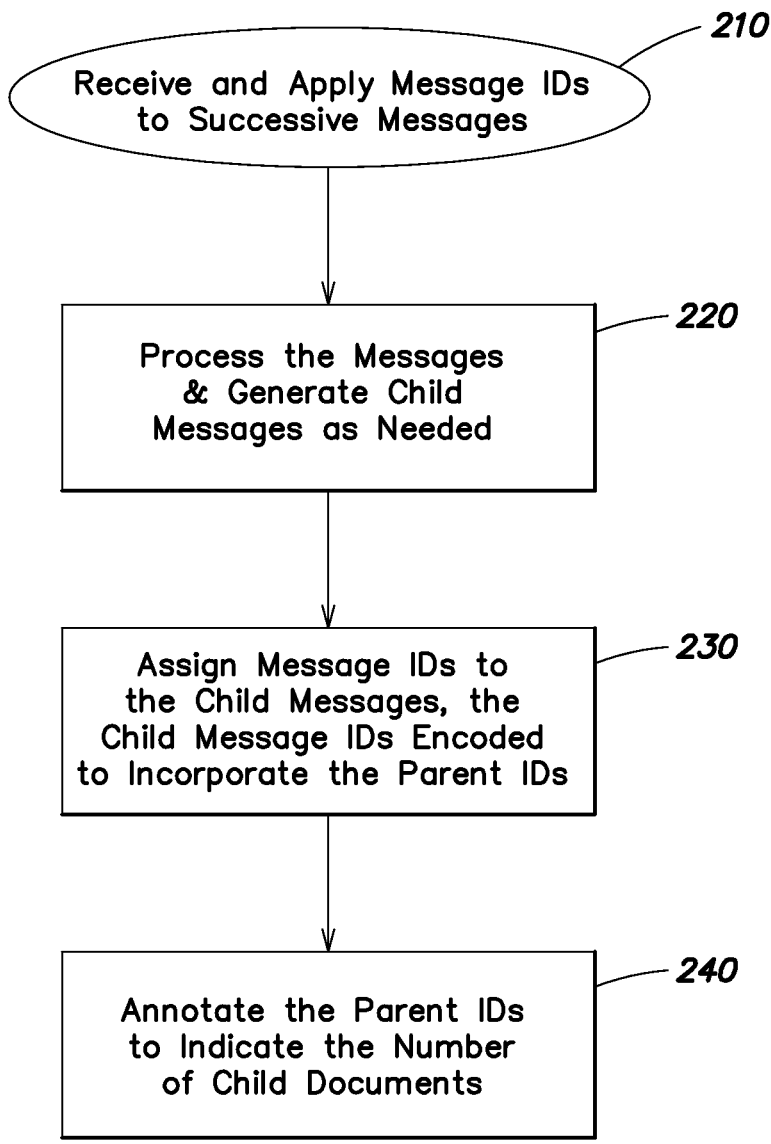
FIG. 2 is a flow chart describing how message identifiers are assigned to messages.

FIG. 2 is a flow chart describing a method 200 for assigning message identifiers to messages. At step 210, a message with a message identifier is received. Next, at 220, the message is processed, and one or more child messages are generated. For example, a message such as an email may contain multiple attachments, and child messages are generated for each attachment. At 230, the child messages are assigned message identifiers that are encoded to incorporate the message identifier of the parent message. At 240, the message identifier of the parent message is annotated to indicate the number of child messages. This annotation allows a processing node to know when all related messages have been received. Although the method 200 is shown to transpire in a particular sequence, other sequences are possible, as well, in other embodiments. A processing node that generates a group of dependent messages implements this message identifier assignment process.

For example, assume at step 210 a message is received which has a message identifier of '1' and is an email message containing multiple attachments. At 220, an email processing node processes the email message and generates child messages for each attachment. Each attachment is inserted into a message that incorporates the parent's message identifier. In this case, the parent identifier is '1'; therefore, if there are two attachments, the first attachment will be inserted into a message with a multi-part message identifier of '1.1' and the second attachment inserted into a message with the identifier '1.2' At 240, the message identifier of the parent message is annotated as having two child messages. Further assume that child document '1.1' has two children. At 220, the child messages are generated, and at 230 the child messages are assigned IDs of '1.1.1' and 1.1.2.' Child document '1.1' is then, at 240, annotated as having 2 children.

FIGS. 3A-3D illustrate example applications using a directed graph to represent multiple processing steps (nodes) within a document ingestion system. One or more sources of documents supply input into the system via a processing node 302. Sources may include file system repositories, email servers, physical media (e.g., CD-ROM, DVDs), text translated from speech recognition systems, database, etc. The processing node 302 manages the ingestion of documents into the processing steps, either from external sources or as additional documents are "discovered" during processing and routed back into the system. Documents are initially routed into a document type splitter 304. The splitter 304 determines which subsequent processing node (or nodes) to send the message. For example, the system may include an email node 306 for processing email text (which in some cases may include header information and/or routing information as well as the email text), a .zip processing node 308 for processing documents created using pkZIP or some other file archiving or compression program, a .doc processing node 310 for processing documents created using Microsoft Word (or other word processing programs such as GOOGLE DOCS, OpenOffice, etc.), and a .pdf processing node 312 for processing documents in portable document format. Other examples of processing nodes not shown include a .jpg processing node for processing images, an .mpeg node for processing movies, an .avi node for processing audio, nodes for processing various structured data formats, etc. In the example provided, there are four different processing nodes; however any number of nodes is possible and typically based on the number and types of documents available to the system. In some cases, an application may include multiple processing nodes performing the same function (e.g., three nodes dedicated to .jpg files) if a high number of documents of that type are encountered frequently and/or if the process is resource intensive.

In some instances, a processing node breaks a message down into additional messages that are subjected to further analysis. For example, an email may have one or more attachments, each of which is subjected to different processing at different processing nodes. Furthermore, there may be instances in which, in order to maintain integrity of the document index, documents having more than one component should not be written to the index unless and until all of the components have been successfully processed. In other words, if the processing of certain attachments to an email fails, the text of the email (and other components or attachments that were successfully processed) should not be written to the index. Some implementations may allow for partial document indexing, whereas in others this constraint may be enforced without exception. In some cases, rules may be used to determine which "failures" are considered acceptable, and which are fatal. The message identifiers described above in connection with FIG. 2 are used for this purpose to associate parent messages, for example, messages containing emails, with child messages (e.g., email attachments). The parent messages are annotated to indicate the number of child messages that are generated.

In general, each processing node includes a message queue. Message queues are used to store multiple messages awaiting processing at a particular node. The message queue also can reorder messages within a group of dependent messages based on their message identifiers as they arrive at a processing queue out of order.

Figure 3A:
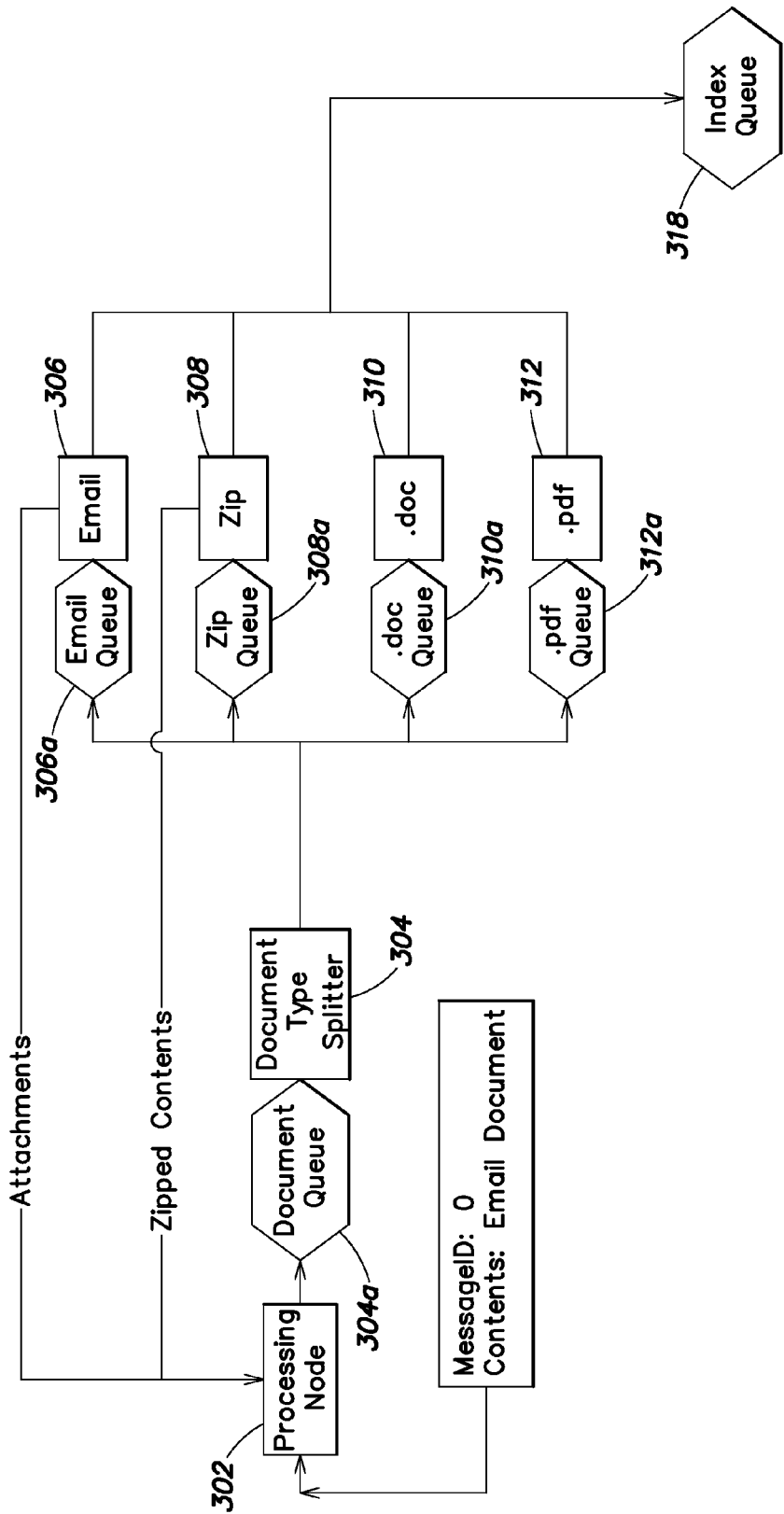
FIGS. 3A-3D are block diagrams of additional examples using a directed graph to represent multiple processing nodes within a document ingestion system.

FIG. 3A illustrates how a simple email message (e.g., an email having message text but no attachments) is processed according to one embodiment. As an email enters the system, it is inserted into a message assigned with a message ID of 0 and is forwarded to the document type splitter queue 304a. The document then proceeds to the splitter 304 when the resource is available. The splitter 304 recognizes it as an email and forwards the message to the email queue 306a in preparation for processing by the email processing node 306.

In instances in which the email includes attachments, the message containing the email may be annotated to indicate that there are child messages associated with the email so that the indexer, when processing the index queue 318, knows when all related messages have been received. When a new 'child' message is generated for downstream processing, the current message is marked as "having a child" and the new child message is assigned a message ID encoded to incorporate the parent ID. Such cross-references of messages allows a message to be held at subsequent processing nodes until all its children (or its parent and sibling messages) arrive at the same node for processing.

Messages requiring processing (e.g., message ID 0 at the email node 306) are processed and forwarded to the index queue 318 and released to the index when it is available.

Figure 3B:
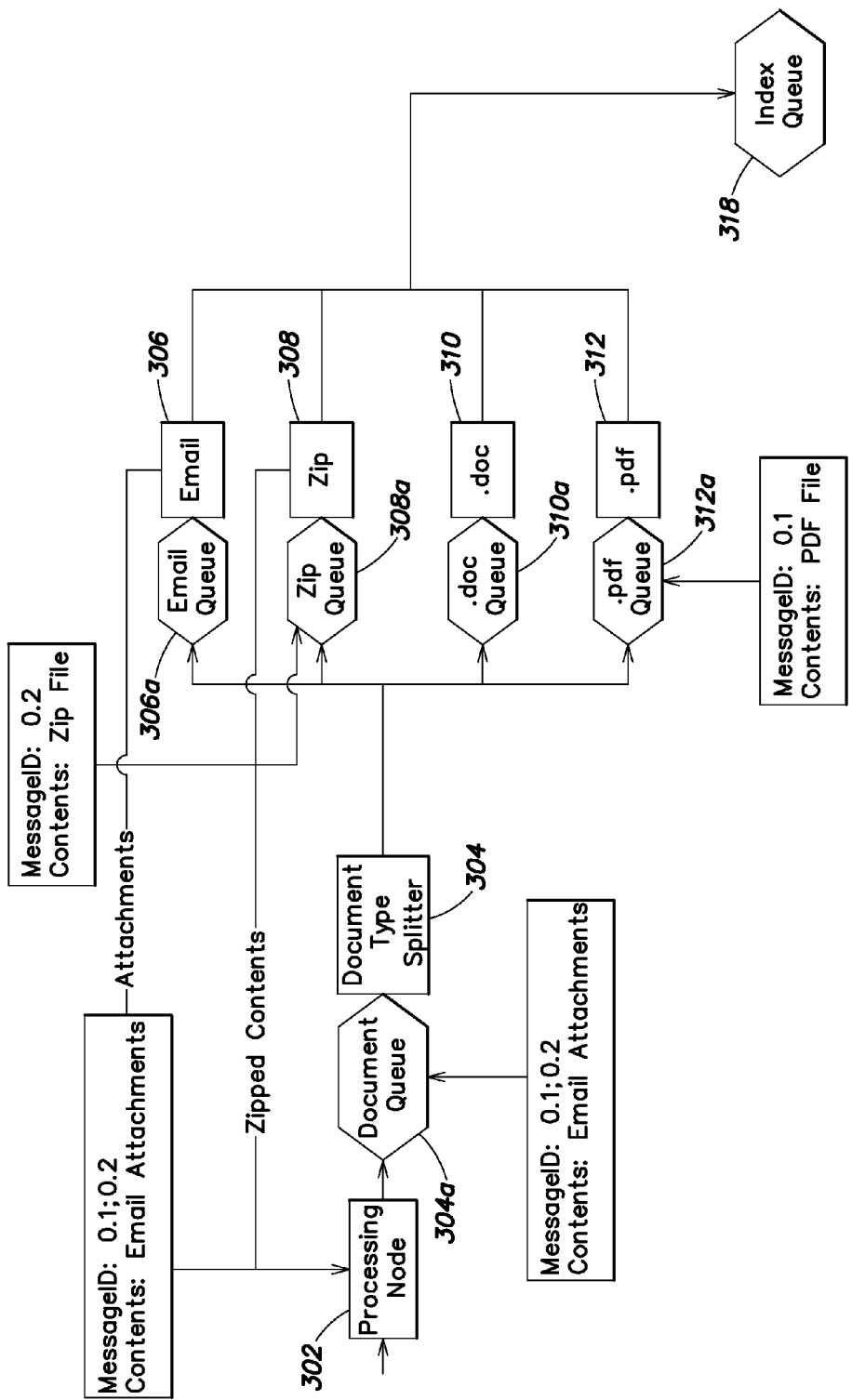
Figure 3C:
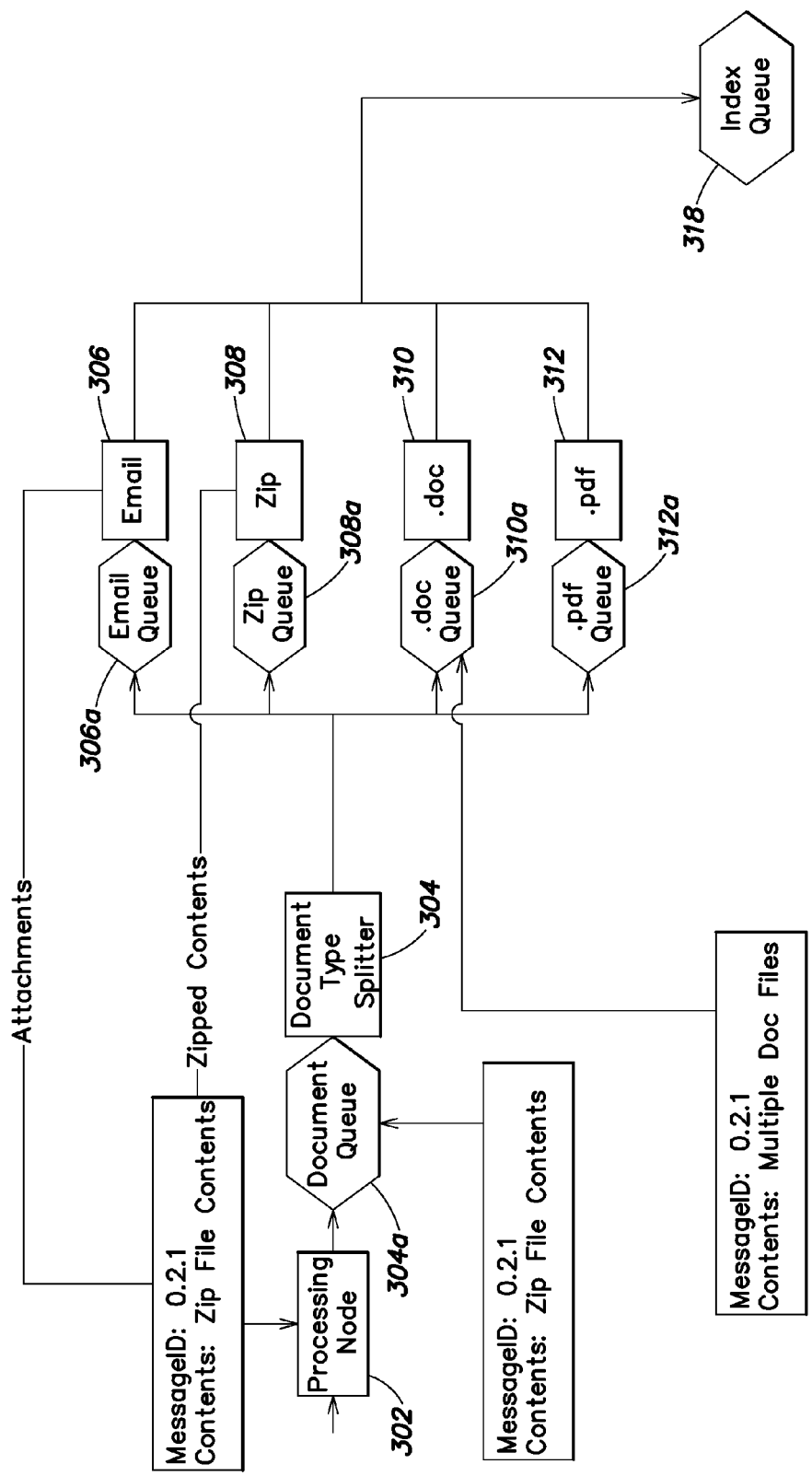
Figure 3D:
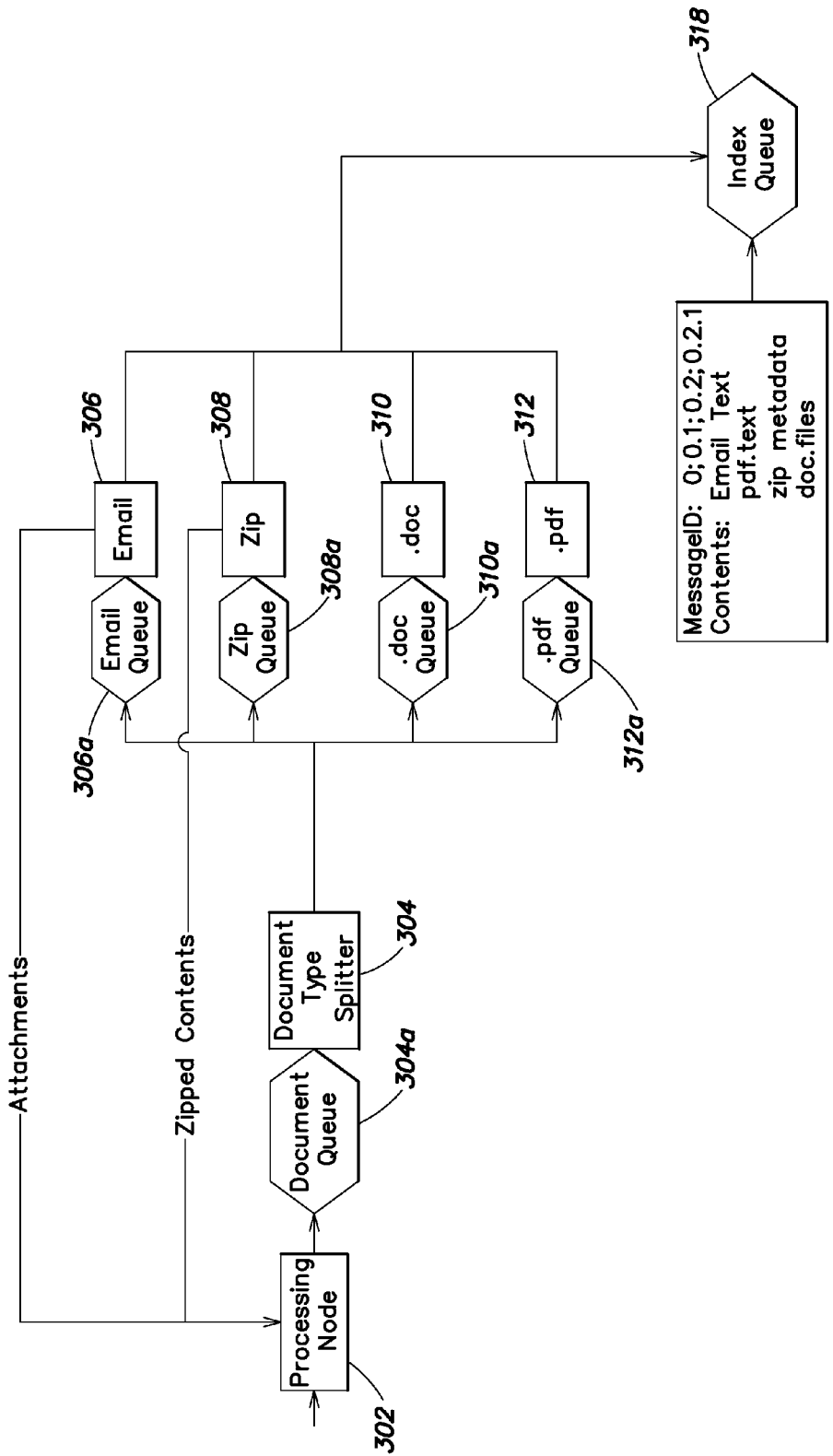

FIGS. 3B-3D illustrate a slightly more complex case in which the email message has two attachments—a .pdf file and a .zip file that includes multiple compressed .doc files. Referring specifically to FIG. 3B, after processing at the email node 306, each attachment is assigned the next multi-part message ID, re-routed back to processing node 302, and placed in the document queue 304a. The document splitter 304 forwards the child message including the .pdf file to the .pdf queue 312a and the child message including the .zip file to the .zip queue 308a. These two child messages are encoded with parent message ID 0 and are processed at their respective processing nodes 308 and 312. While processing the .zip file, the .zip node 308 recognizes that there are multiple files included in the .zip file and annotates the message with an indication that there are n child messages related to the message, where n represents the number of files included in the .zip file. The child messages are then forwarded to the index queue 318. The indexer determines that all messages having the same message ID have been received. However, the indexer may not process the two messages because the .zip child message includes an indication that two additional child messages (the .doc files) exist. So, the indexer waits for the processing of those files to be completed.

Referring now to FIG. 3C, the .zip file contents are assigned multi-part message identifiers, rerouted back to the processing node 302, and forwarded to the document queue 304a. The splitter 304 forwards the two .doc files having the new multi-part message ID to the .doc queue 310a. All messages having the new multi-part message ID are routed to the index queue 318. The index will await receipt of the child messages noted in the original messages having the initial multi-part message IDs (two children) and the new multi-part message ID (one child) before storing the messages in the index. FIG. 3D illustrates the message having a message ID of 0 and the hierarchical listing of its child messages (the .zip file and the .pdf file) and grandchild message (.doc files) being placed in the index queue 318.

Figure 4:
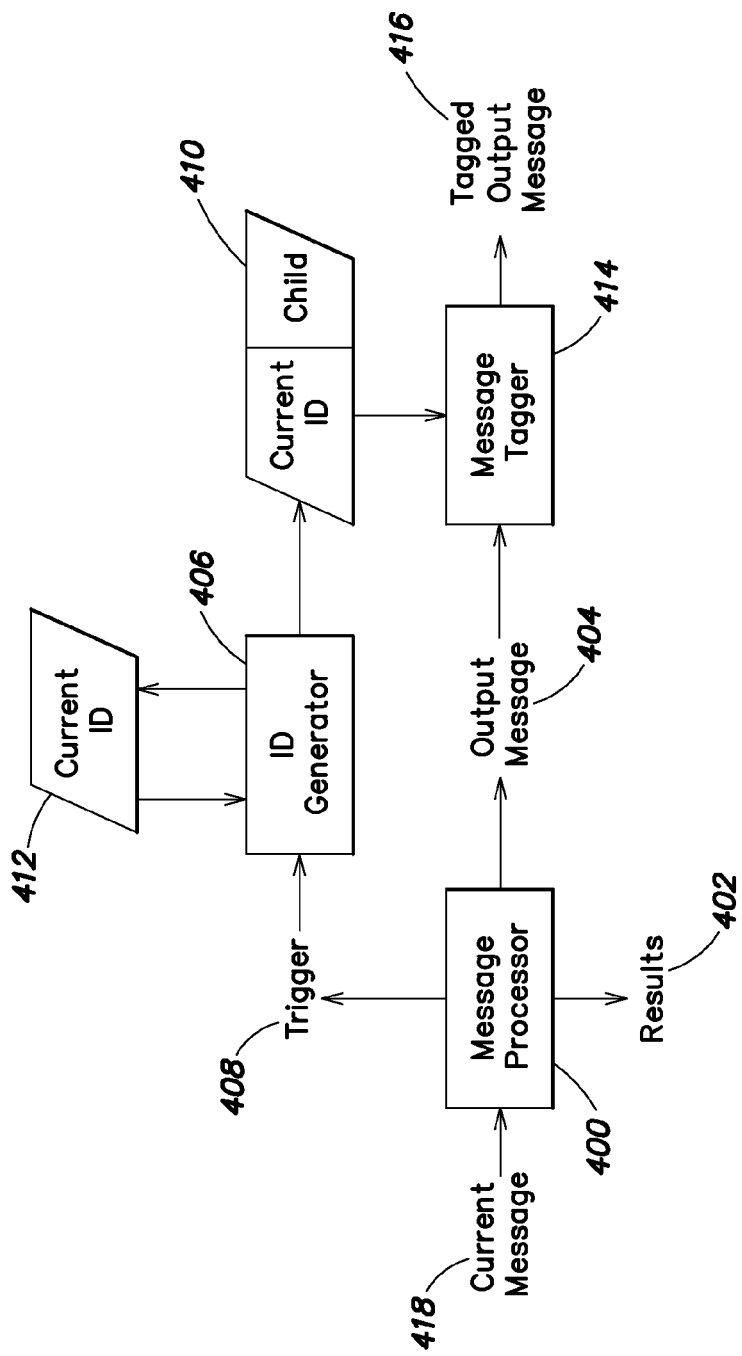
FIG. 4 is a block diagram of an example structure for a processing node that generates groups of messages.

FIG. 4 is a block diagram of an example structure for a processing node that generates groups of messages.

Figure 5:
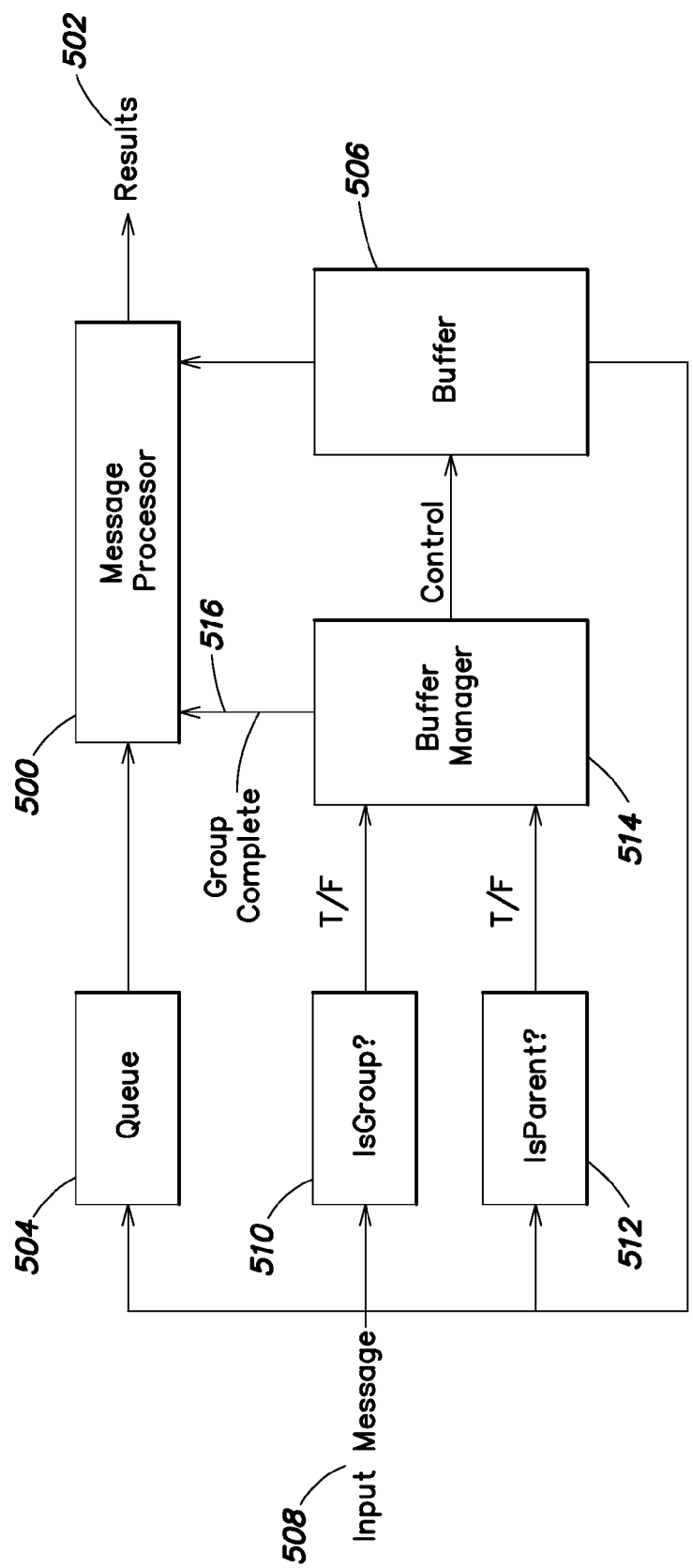
FIG. 5 is a block diagram of an example structure for a processing node that processes groups of messages.

The processing node generally includes a message processor 400 that processes a current message 418. This message processor 400 may generate results 402 as a result of processing the message. For example, this may include processing the metadata associated with a .zip file. The message processor 400 also may output one or more output messages 404, which are child messages of the current message being processed. For example, if this processing node is for processing .zip files, then a message to delete previous contents (the results of processing an earlier version of the zip file) of the zip file is generated. In addition, each document within the .zip file becomes an output message 404. The message processor 400 would then instruct an ID generator 406, through a trigger 408, to generate a message identifier 410 for the child message using the message identifier 412 of the current message. The ID generator 406 then updates the current message identifier 412 to indicate that it has an additional child message. A message tagger 414 tags the output message 404 with the child message identifier 410 and outputs the tagged message 416. If the message processor 400 outputs more than one child message, as each child message is output the message identifier 412 of the current message is updated to reflect the number of child messages generated. The current message 418 is then output, augmented with the results 402 and message identifier as modified by the ID generator 406. FIG. 5 is a block diagram of an example structure for a processing node that processes groups of messages.

The processing node generally includes a message processor 500 that processes a current message. This message processor 500 may output results 502 as a result of processing the message. A processing node that processes groups of dependent messages in order uses a sorted buffer or queue 506 to store messages from the group until all of the messages of the group are received, and can begin processing the messages in the group after the parent message is received. Until it begins processing messages from a group, it can process other messages from its input queue 504. While processing messages within a group, the message processor 500 also may process messages from the input queue 504.

Figure 6:
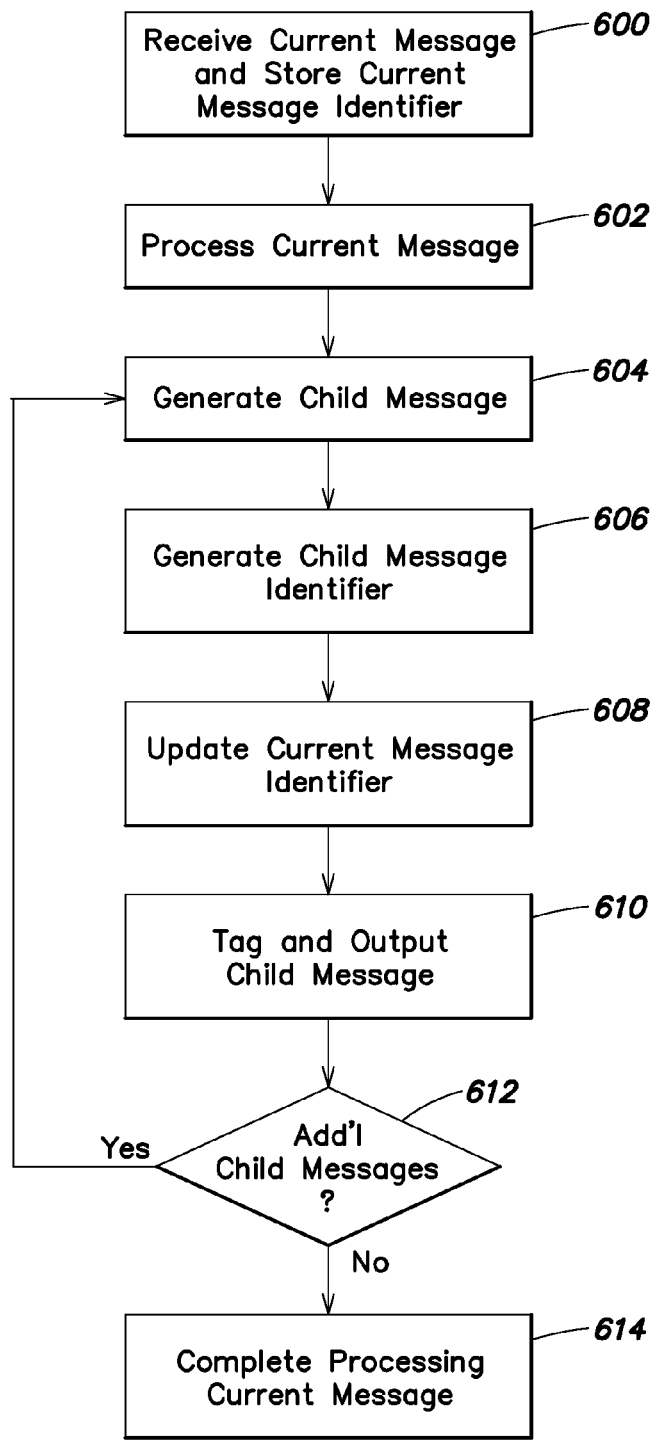
FIG. 6 is a flowchart describing an example of how a processing node such as in FIG. 4 can operate.

The processing node processes each input message 508 to determine whether the message is in a group of dependent messages (as indicated by the message identifier), as indicated by module "IsGroup?" 510. If a message is not in a group, it is placed in the input queue 504 and can be processed at any time by the message processor 500. If the message is in a group, it is also determined whether the message is the parent node of the group, or a parent node within the group, as indicated by module "IsParent?" 512 (as indicated by the message identifier). Whether a message is in a group and/or is a parent node is indicated to a buffer manager 514. The buffer manager tracks the incoming messages in a group of dependent messages and places them in the buffer 506. The buffer manager also determines whether all of the messages in a group have been received (by examining the message identifiers), and provides a "group complete" indication to the message processor 500. The message processor 500 can then start processing the group's messages from the buffer in order. A flowchart describing how a processing node such as in FIG. 4 can operate will now be described in connection with FIG. 6.

The processing node receives a current message and stores the current message identifier in step 600. The processing node begins 602 processing the current message. If a child message is generated by processing the current message, the child message is generated 604. A child message identifier is then generated 606. The current message identifier is then updated 608 to reflect that the current message has at least one child message. If this child message is the first child message, the current message identifier is changed to add an indicator of the number of child messages, which is set to 1. Otherwise the number of child messages is incremented. The child message is then tagged with its message identifier and output in step 610. If additional child messages are detected, as determined at 612, this process repeats steps 604 through 610.

Both before and after step 612, the processing of the current message continues and ultimately completes (as indicated at 614).

A flowchart describing how a processing node such as in FIG. 5 can operate will now be described in connection with FIG. 7.

Figure 7:
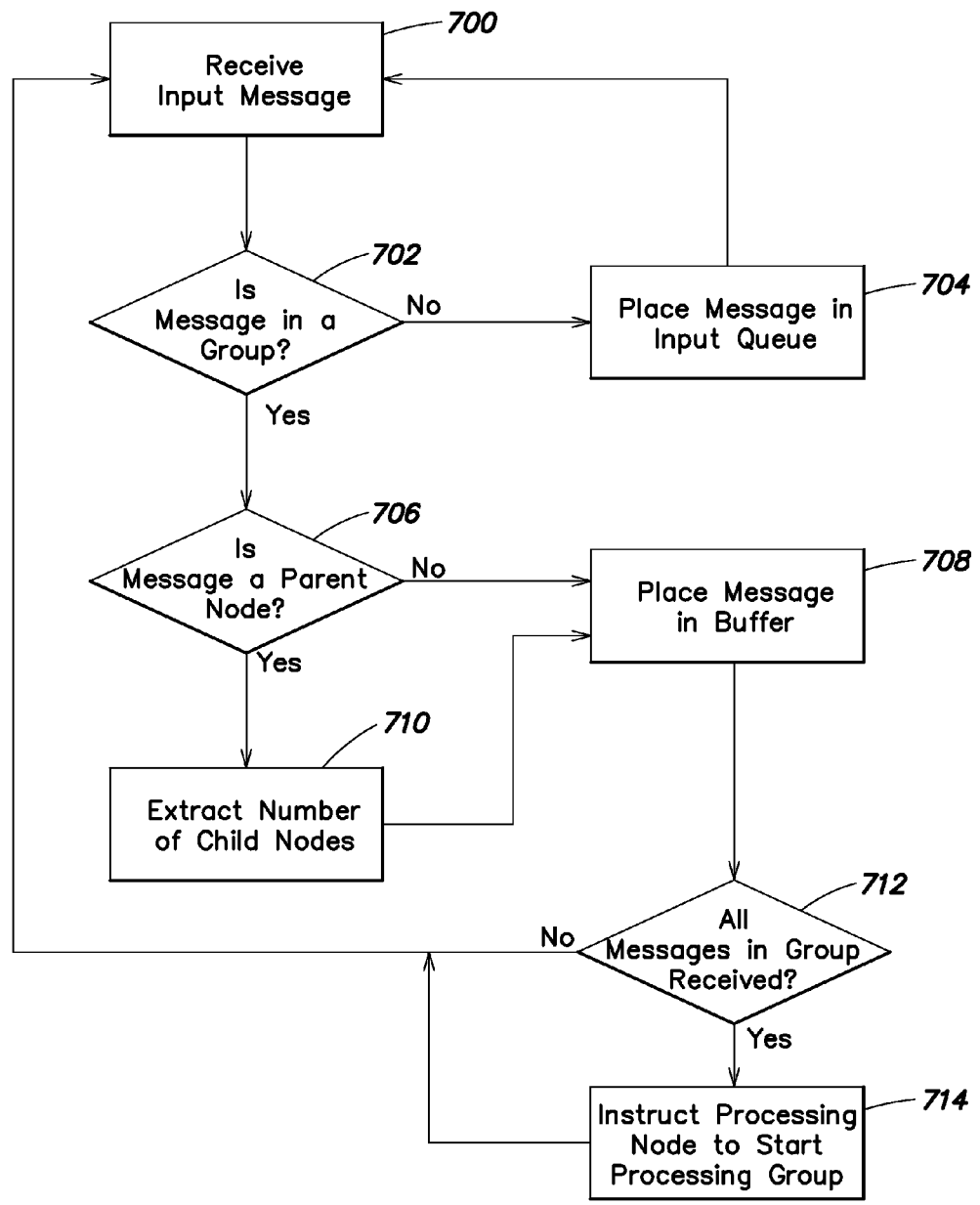
FIG. 7 is a flowchart describing an example of how a processing node such as in FIG. 5 can operate.

In FIG. 7, a processing node receives 700 an input message. It is determined 702 whether the message is within a group of dependent messages by examining its message identifier. If the message is not in a group, then it is placed 704 in the input queue. If the message is in a group, then it is determined 706 whether the message is a parent node. If the message is not a parent node, it is placed 708 in a buffer. If the message is a parent node, the number of child nodes is determined, for example by extracting 710 the number of child nodes from its message identifier. The message is then placed 708 in the buffer. The processing node then determines 712 whether all of the messages from the group of messages are present in the buffer. If all of the messages have been received, the processing node is instructed 714 that it can start processing the group. After a message from a group has been processed and placed in the buffer, or if the message was otherwise placed in the input queue, the processing node is ready to process the next incoming message at 700. The processing node may be processing messages in the input queue or from complete groups in the buffer while input messages are being directed into the input queue or buffer.

The processing nodes and their components and modules described throughout the specification can be implemented in whole or in part as a combination of one or more computer programs operating on one or more processors using any suitable programming language or languages (C++, C#, java, Visual Basic, LISP, BASIC, PERL, etc.) and/or as a hardware device (e.g., ASIC, FPGA, processor, memory, storage and the like).

An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof. The foregoing embodiments are therefore to be considered in all respects illustrative rather than limiting on the invention described herein.

What is claimed is:

1. A computer system for processing data using messages, comprising:
   a plurality of independent, asynchronous processing nodes, the processing nodes comprising one or more computer programs running on one or more computers, the processing nodes interconnected in a manner represented by a directed graph;
   wherein the plurality of processing nodes includes a first node configured to output groups of messages; and
   wherein the plurality of processing nodes includes a second node configured to process messages within a group of messages output by the first node in order;
   wherein the second node comprises:
      a buffer in memory for storing messages in a group of messages; and
      a buffer manager configured to, for each message in a group of messages:
         determine whether the message is a parent message, and
         if the message is not a parent message, then place the message in the buffer, and
         if the message is a parent message, then determine a number of child messages and place the message in the buffer.

2. The computer system of claim 1,
   wherein each message has a unique identifier,
   wherein within a group of messages the unique identifiers of the messages are represented by a tree.

3. The computer system of claim 2, wherein the unique identifier of a child message is indicative of a parent message, and the unique identifier of a parent message is indicative of a number of child messages.

4. The computer system of claim 1, wherein the first node comprises:
   a message identifier generator having an input that receives a message identifier of a parent message and an output providing a message identifier for a child message; and
   a message tagger having inputs that receive the message identifier for the child message, and the child message to be output by the first node, and which associates the message identifier with the child message.

5. The computer system of claim 1, wherein the buffer manager is configured to detect whether all messages from the group of messages have been received by the second node.

6. The computer system of claim 5, wherein the buffer manager detects whether all messages from the group of messages have been received by comparing a number of parent messages and child messages from the message identifiers to a number of messages in the buffer.

7. The computer system of claim 5, wherein the second node further comprises a message processor, wherein the message processor processes messages from the first node and the buffer, and wherein the message processor processes a group of messages in the buffer in order with respect to each other after the buffer manager detects whether all messages from the group of messages have been received.

8. A computer system for processing data using messages, wherein each message has a unique identifier, comprising:
   a plurality of independent, asynchronous processing nodes, the processing nodes comprising one or more computer programs running on one or more computers, the processing nodes being interconnected in a manner represented by a directed graph, including:
   at least one first node comprising:
      an input for receiving an input message, wherein the input message is a parent message with a unique identifier,
      a first message processor for processing the parent message and having an output providing one or more child messages within a group of messages, and an output providing the child messages, wherein each child message has a unique identifier which is indicative of the parent message, and the unique identifier of a parent message is modified to be indicative of a number of child messages;

at least one second node comprising:
a buffer in memory for storing messages in a group of messages, and
a buffer manager configured to, for each message in a group of messages, determine whether the message is a parent message, and if the message is not a parent message, then place the message in the buffer, and if the message is a parent message, then determine a number of child messages and place the message in the buffer, wherein the buffer manager is further configured to detect whether all messages from the group of messages have been received by the second node, and wherein the message processor processes a group of messages in the buffer in order after the buffer manager detects whether all messages from the group of messages have been received.

9. A computer program product, comprising:
a computer-readable storage device;
computer program instructions stored on the computer-readable storage medium that when processed by a computer instruct the computer to implement a system for processing data using messages, the system comprising:
a plurality of independent, asynchronous processing nodes, the processing nodes comprising one or more computer programs running on one or more computers, the processing nodes being interconnected in a manner represented by a directed graph;
wherein the plurality of processing nodes includes a first node configured to output groups of messages; and
wherein the plurality of processing nodes includes a second node configured to process messages within a group of messages output by the first node in order;
wherein the second node comprises:
a buffer in memory for storing messages in a group of messages;
a buffer manager configured to, for each message in a group of messages:
determine whether the message is a parent message, and
if the message is not a parent message, then place the message in the buffer, and
if the message is a parent message, then determine a number of child messages and place the message in the buffer.

10. The computer program product of claim 9,
wherein each message has a unique identifier,
wherein within a group of messages the unique identifiers of the messages are represented by a tree.

11. The computer program product of claim 10, wherein the unique identifier of a child message is indicative of a parent message, and the unique identifier of a parent message is indicative of a number of child messages.

12. The computer program product of claim 9, wherein the first node comprises:
a message identifier generator having an input that receives a message identifier of a parent message and an output providing a message identifier for a child message; and
a message tagger having inputs that receive the message identifier for the child message, and the child message to be output by the first node, and which associates the message identifier with the child message.

13. The computer program product of claim 9, wherein the buffer manager is configured to detect whether all messages from the group of messages have been received by the second node.

14. The computer program product of claim 13, wherein the buffer manager detects whether all messages from the group of messages have been received by comparing a number of parent messages and child messages from the message identifiers to a number of messages in the buffer.

15. The computer program product of claim 13, wherein the second node further comprises a message processor, wherein the message processor processes messages from the input queue and the buffer, and wherein the message processor processes a group of messages in the buffer in order with respect to each other after the buffer manager detects whether all messages from the group of messages have been received.

* * * * *

UNITED STATES PATENT AND TRADEMARK OFFICE
CERTIFICATE OF CORRECTION

Page 1 of 1

PATENT NO.        : 8,875,155 B2
APPLICATION NO.   : 13/943624
DATED             : October 28, 2014
INVENTOR(S)       : Johnson, III et al.

It is certified that error appears in the above-identified patent and that said Letters Patent is hereby corrected as shown below:

In the claims

Column 10 line 37 claim 15, "input queue" should read -- first node --.

Signed and Sealed this
Twenty-third Day of February, 2016

Michelle K. Lee
*Director of the United States Patent and Trademark Office*